United States Patent
Hollar

(10) Patent No.: US 7,865,057 B2
(45) Date of Patent: Jan. 4, 2011

(54) METHOD AND APPARATUS FOR CONVEYING RIGHTS ACROSS AN ANALOG VIDEO INTERFACE

(75) Inventor: Mark A. Hollar, Palo Alto, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 1561 days.

(21) Appl. No.: 10/753,844

(22) Filed: Jan. 7, 2004

(65) Prior Publication Data

US 2005/0084102 A1    Apr. 21, 2005

Related U.S. Application Data

(60) Provisional application No. 60/509,514, filed on Oct. 7, 2003.

(51) Int. Cl.
*H04N 5/91* (2006.01)

(52) U.S. Cl. .................. 386/94; 386/109; 386/112; 386/124; 360/60; 380/201; 380/202; 380/203; 380/204; 380/205; 705/57; 369/53.21

(58) Field of Classification Search .................. 386/94, 386/109, 112, 124; 360/60; 380/201–209; 705/57; 369/53.21

See application file for complete search history.

(56) References Cited

U.S. PATENT DOCUMENTS 4,577,216 A    3/1986 Ryan (Continued)

FOREIGN PATENT DOCUMENTS

EP    0 855 837 A2    7/1998

(Continued)

OTHER PUBLICATIONS

International Search Report mailed on Feb. 4, 2005 for PCT patent application No. PCT/US2004/032611 filed on Oct. 1, 2004, 5 pages.

(Continued)

*Primary Examiner*—Thai Tran
*Assistant Examiner*—Helen Shibru
(74) *Attorney, Agent, or Firm*—Morrison & Foerster LLP

(57) ABSTRACT

Method and apparatus for controlling subsequent permitted use, such as storage, of video on a digital storage device such as a personal video recorder (PVR). An analog video signal is provided with at least one modification to its video characteristics, for instance in the horizontal blanking interval and vertical blanking intervals, which is of the type having the capacity to inhibit making an acceptable analog video recording of the analog video signal. Examples of these modifications are the well known pseudo-sync (automatic gain control), color stripe (color burst modifications), and added back porch pulses. The pattern of presence or absence or nature of the modifications also serves as a code to carry information as to the subsequent permitted use in the digital realm, such as whether the accompanying content of the video signal is allowed to be digitally recorded in digital form in a compatible PVR personal video recorder, and if it is allowed to be recorded, the length of time that the recording is allowed to persist, for instance one day, one week, one month. Hence the modifications to the analog video signal have a dual use in both inhibiting recording in the analog realm and carrying information across the analog video interface so as to control storage (copying) or other use of the video in the digital realm.

61 Claims, 9 Drawing Sheets

U.S. PATENT DOCUMENTS

| | | | |
|---|---|---|---|
| 4,631,603 A | 12/1986 | Ryan | |
| 4,819,098 A | 4/1989 | Ryan | |
| 4,907,093 A | 3/1990 | Ryan | |
| 5,315,448 A | 5/1994 | Ryan | |
| 5,729,516 A * | 3/1998 | Tozaki et al. | 369/53.21 |
| 5,784,523 A | 7/1998 | Quan et al. | |
| 6,035,094 A | 3/2000 | Kori | |
| 6,108,423 A | 8/2000 | Sako et al. | |
| 6,256,392 B1 | 7/2001 | Sako et al. | |
| 6,278,836 B1 * | 8/2001 | Kawara et al. | 386/94 |
| 6,381,747 B1 | 4/2002 | Wonfor et al. | |
| 6,421,497 B1 * | 7/2002 | Quan | 386/1 |
| 6,516,132 B1 | 2/2003 | Wrobleski et al. | |
| 6,587,638 B1 | 7/2003 | Watanabe et al. | |
| 6,600,873 B1 | 7/2003 | Brill et al. | |
| 6,950,520 B1 | 9/2005 | Ryan et al. | |
| 2002/0057900 A1 * | 5/2002 | Nakajima | 386/94 |
| 2005/0084102 A1 | 4/2005 | Hollar | |

FOREIGN PATENT DOCUMENTS

| | | | |
|---|---|---|---|
| EP | 0 855 837 A3 | | 7/1998 |
| JP | 09-098381 | * | 5/1996 |
| JP | 09-098381 | | 4/1997 |
| JP | 9-98381 | | 4/1997 |
| JP | 10-210436 A | | 8/1998 |
| JP | 2001-69452 A | | 3/2001 |

OTHER PUBLICATIONS

Notice of Grounds for Refusal dated Jul. 26, 2007, for KR Application No. 10-2006-7006761, filed Sep. 30, 2004. 6 pages.

Korea Office Action mailed Jul. 26, 2007, for Korea Application No. 10-2006-7006761 filed Sep. 30, 2004, 6 pages.

Japanese Office Action mailed on Aug. 3, 2010, for Japanese Application No. 2006-534219, filed on Sep. 30, 2004, 4 pages. (English Translation).

* cited by examiner

| APS State | AGC | CS | Behavior |
|---|---|---|---|
| 0 | off | off | storage permitted |
| 1 | on | off | set storage duration |
| 2 | on | 2-line | do not store |
| 3 | on | 4-line | 90 minutes of storage |

FIG. 1

| Storage duration | APS sequence |
|---|---|
| 90 minutes | 3  3 3 3 3 3 |
| 36 hours | 3  1 0 3 1 0 ... |
| 1 week | 3  1 3 1 3 1 ... |
| 1 month | 3  0 3 0 3 0 ... |
| 6 months | 3  0 1 3 0 1 ... |

FIG. 2A

| APS STATE | AGC | CS | BPP | Behavior (Use Control) NTSC-TV | PAL-TV |
|---|---|---|---|---|---|
| 0 | off | off | off | Copy | Copy |
| 1 | on | off | 6 pre/0 po | TS (30d/24h) | Copy Never |
| 2 | on | 2-line | 6 pre/0 po | Buffer (90) | Copy Never |
| 3 | on | 4-line | 6 pre/0 op | Copy Never | Copy Never |
| 4 | on | off | Off | Copy Never | Copy Never |
| 5 | on | off | 0 pre/1 po | TS (30d/24h) | TS (30d/24h) |
| 6-39 | on | off | 0:6 pre/0:6 po | (Reserved) | (Reserved) |
| 40 | off | off | 0 pre/1 po | COG | COG |
| 41 | off | off | 0 pre/2 po | COGHD | COGHD |
| 42 | off | off | 0 pre/3 po | MAD | MAD |
| 43 | off | off | 0 pre/4 po | CAD | CAD |
| 44-75 | off | off | 0:6 pre/0:6 po | (Reserved) | (Reserved) |

FIG. 2B

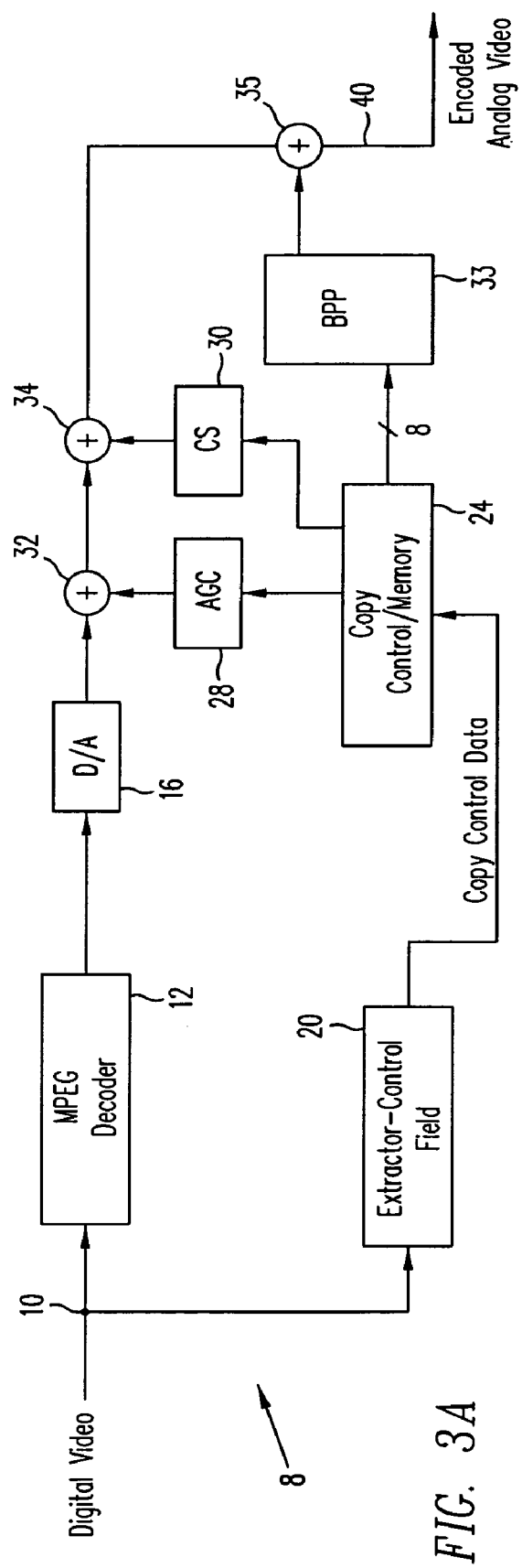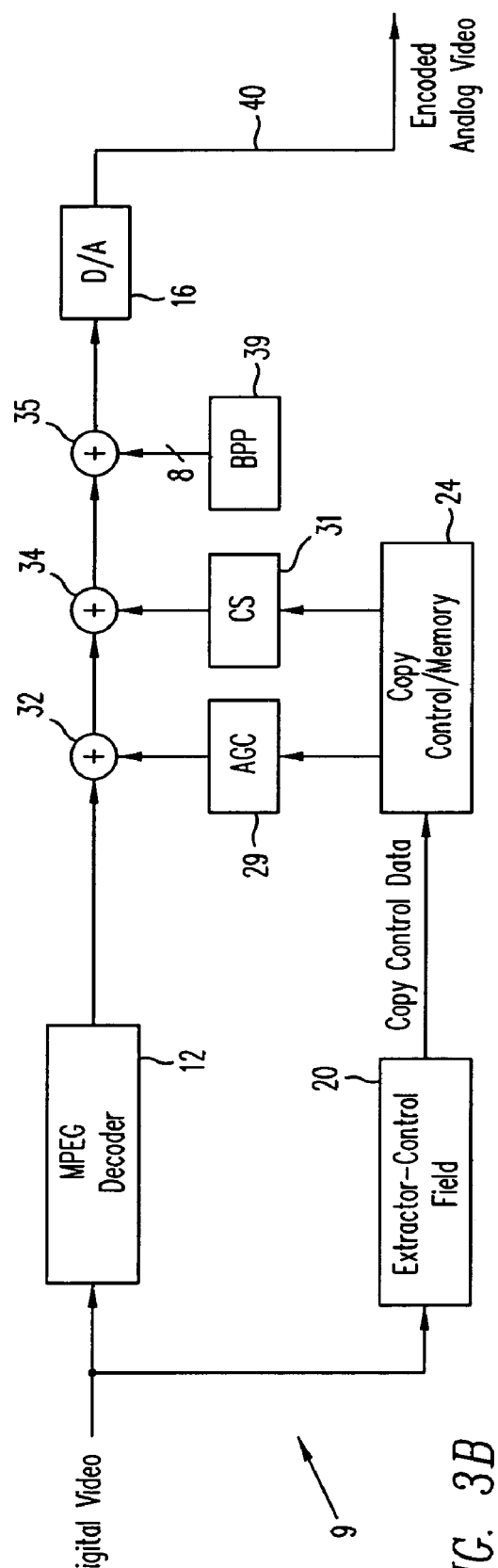
FIG. 3A
FIG. 3B

METHOD AND APPARATUS FOR CONVEYING RIGHTS ACROSS AN ANALOG VIDEO INTERFACE

CROSS-REFERENCE TO RELATED APPLICATION

This application claims priority to U.S. provisional application No. 60/509,514, filed Oct. 7, 2003, incorporated herein by reference in its entirety.

STATEMENT REGARDING FEDERALLY SPONSORED RESEARCH OR DEVELOPMENT

Not applicable.

REFERENCE TO A COMPACT DISK APPENDIX

Not applicable.

FIELD OF THE INVENTION

This disclosure relates to video and more specifically to controlling use of video content.

BACKGROUND

The technical problems of video use control such as video copy inhibition and copy control are well known. These are techniques to prevent or discourage unauthorized copying of typically copyrighted movies or television programs or other video material. An example of copy inhibition is disclosed in Ryan U.S. Pat. No. 4,631,603, incorporated herein by reference in its entirety, wherein an analog video signal is modified so that a television receiver will still provide a normal color picture from the modified video signal, while a video tape recording of the modified video signal when replayed produces generally unacceptable television pictures. This "AGC" method relies on the fact that particular video cassette recorder (VCR) automatic gain control systems cannot distinguish between normal "sync" (synchronization) pulses of a conventional video signal and added "pseudo-sync" pulses. Ryan discloses adding pseudo-sync (negative going) pulses paired with positive going ("automatic gain control") pulses in the vertical blanking intervals in order to result in unacceptable picture quality during playback of a recorded analog video signal. Another type of copy inhibition (also for analog video) is disclosed in Ryan U.S. Pat. No. 4,577,216 and Wrobleski et al. U.S. Pat. No. 6,516,132 both incorporated by reference in their entirety and disclosing what is called the "color stripe" (CS) process wherein the color burst conventionally present in the horizontal blanking interval on each line of active color video (in the analog domain) is modified in terms of its phase so that any subsequent video tape recording of the video signal shows undesirable variations in the color fidelity that appear as bands or stripes of color error.

Another type of analog video copy inhibition is in Ryan U.S. Pat. No. 4,819,098 also incorporated by reference in its entirety disclosing what is referred to here as the "back porch pulse" ("BPP") process or modification wherein a positive going pulse is added to the video signal immediately following a trailing edge of normally occurring horizontal synchronization pulses, hence being in the horizontal sync pulse's back porch region. (In this context positive going refers to the standard video waveform where the horizontal synchronization pulses are negative going, with their back porches being in NTSC-TV at an amplitude of 0 IRE units in the active video portion of the video signal, and their lowest part extending down to an amplitude of about −30 IRE units.) The back porch pulses typically have an amplitude of about the same level as the peak white level in the active video but brief duration, e.g. 4 microseconds, to achieve the maximum anti-copy effect. In one commmercialized version of this BPP process, up to 15 such pulses are added (chiefly in the vertical blanking interval—VBI) prior to the vertical synchronization broad pulses and up to 15 such pulses are added after the vertical synchronization broad pulses, in each frame of video. (In NTSC-TV, the VBI extends from video scan line 1 to line 21 but the back porch pulses may be added also in active video in the overscan part of the picture.) The BPP process is compatible with NTSC, PAL, and SECAM television as are the AGC and CS processes.

Also well known are various copy control techniques suitable for use with either analog or digital video wherein typically a watermark or some other coded data is included in a video signal and is detected by an especially adapted video recorder. The video recorder upon detecting the watermark or coded data either permits or does not permit copying. In some cases generational (e.g., copy once only) copy control is thereby provided.

However, further copy prevention problems are presented when, for instance, analog video is subsequently recorded (stored) in digital form. This is referred to as the analog video interface. For instance, there is a problem which occurs with what are called, in the video field, personal video recorders (PVR) of the type sold by Replay TV and TiVo. These digital storage devices (which include a hard disk drive) enable digital recording of broadcast TV, cable TV or other analog video signals. The digital signal processing circuitry of these devices typically strips off any of the above described analog copy inhibition signals which are present in the blanking intervals. (Note that many digital video recorders similarly do not record the blanking intervals.) In the context of copyrighted video material such as television programs, movies, etc. the copyright owners want to control or prevent such copying (storage) using a PVR or similar type device. Note that in this context PVR devices include not only the standalone PVR devices of the type disclosed above but also, for instance, DVD recorders and personal computers which may include (or not include) a television tuner and which therefore can function the same as a PVR in recording incoming video on their hard disk drive or other type of digital storage.

SUMMARY

Disclosed here is a method of encoding a pattern into an analog video signal using at least one analog domain copy inhibition process such as the above described AGC process, the CS process, and the BPP process. In the present method, not only are these analog signals provided with copy inhibition type processes as disclosed above, in addition these copy inhibition processes are provided in a pattern used to carry data controlling uses of the video such as the permitted subsequent digital storage of the video signal, for instance in a PVR. Thus the AGC, color stripe, and BPP (or other similar copy inhibition processes) have in some embodiments a dual use, first in inhibiting copying in the analog realm, and second providing in effect a code in the video signal that carries over any interface into the digital realm and thereby indicates what type of subsequent digital video use such as storage, retransmission, or other uses is permissible.

This permissibility is determined, for instance, by the copyright owner or some other external source and is intended to prevent unauthorized use or storage, retransmission, or other uses of the associated video content. In one embodiment the AGC and CS processes are each present ("on") or not present ("off"). Since there are two such processes, each with two conditions (present or not), this provides four different states in one embodiment. The BPP process with its variable number of added pulses per frame is capable of defining many such states and thus by itself or in combination with AGC and CS can define multiple states. Each state has a coded meaning in terms of copy control. For instance the first state indicates that there is no copy control and storage, for instance in a PVR, is permitted with no limitation.

The second state indicates that storage is not permitted. A third state indicates the duration of storage in terms of, for instance, hours, days, etc. A fourth state indicates that storage is permitted, but of the specified duration only.

This encoding of the video signal is provided for instance by the company manufacturing DVDs including the video content, or for instance is rendered in a set top box of the type provided to cable and video satellite subscribers. During DVD authoring by e.g., the copypright owner, certain bits are set in the image file from which DVD discs are stamped during the subsequent replication process. These bits ("trigger bits") are then read by the DVD player from the DVD disc to determine which form, if any, of the AGC, CS, and BPP modifications of the analog video waveform should be made.

In a corresponding decoding process for instance the PVR or personal computer belonging to the consumer detects in an input analog video signal the presence or nature of the copy inhibition processes and the associated encoded pattern and thereby determines what type of storage is permissible on the associated digital storage in the PVR and the duration of that storage for that program, for instance one day, one week, one month, etc. It is to be understood that the PVR or PC or DVD recorder which is compatible with this system includes detection circuitry for detecting these AGC, CS, and BPP or similar processes and for interpreting the pattern defined by them as copy control or copy management data. This requires suitable additional logic processing capability in the PVR or similar device. Hence a PVR or similar device compatible with this system differs in this regard from conventionally available PVRs or personal computers.

Also contemplated is a record carrier such as an otherwise conventional digital video (versatile) disc (DVD) or video tape which carries a video signal modified in accordance with the above encoding method. Video is conventionally stored on the DVD, e.g., in the MPEG-2 compressed video format. This compression removes redundant data (such as the video blanking intervals). However, when the compressed video is decompressed and prepared for conversion from digital to analog, the blanking interval information is reconstructed (a few bits are used to provide information on how the compressed data should eventually be represented on the screen horizontally and vertically). Based on the presence of these "trigger" bits, the blanking intervals are either constructed per normal video standards or constructed per the AGC/CS/BPP modifications. This digital representation of the analog video waveform is then applied to a digital-to-analog converter to create the analog video signal. In one example, the trigger bits are associated with each 2 KB of data (the compressed audio and video data) on the DVD (i.e. a sector). 2 KB is much less than one frame of video. Thus there is sufficient resolution of the trigger bits on the DVD to make changes to the actual waveform every frame to control it that rapidly, if desired, through the bit settings made during the DVD authoring process.

In addition to controlling storage (including recording) other exemplary uses of the present encoding method are (1) control of transmission of the video content across a network, such as within a home, or to another home across a public network; (2) control of rendering of the content by a display at a particular resolution or quality level; and (3) control of subsequent movement of the video to another digital storage device in a network.

BRIEF DESCRIPTION OF THE DRAWINGS

FIG. 1 is a table showing four control states of video use in accordance with this disclosure using the AGC and CS processes;

FIG. 2A shows an example in tabular form of code sequences in accordance with this disclosure for purposes of control of storage;

FIG. 2B shows in tabular form code control states using the AGC, CS, and BPP processes;

FIG. 3A is a block diagram of an encoder of the type present in a set top box or personal computer for carrying out the present encoding process;

FIG. 3B is a block diagram of a second encoder;

DETAILED DESCRIPTION

Figure 4A:
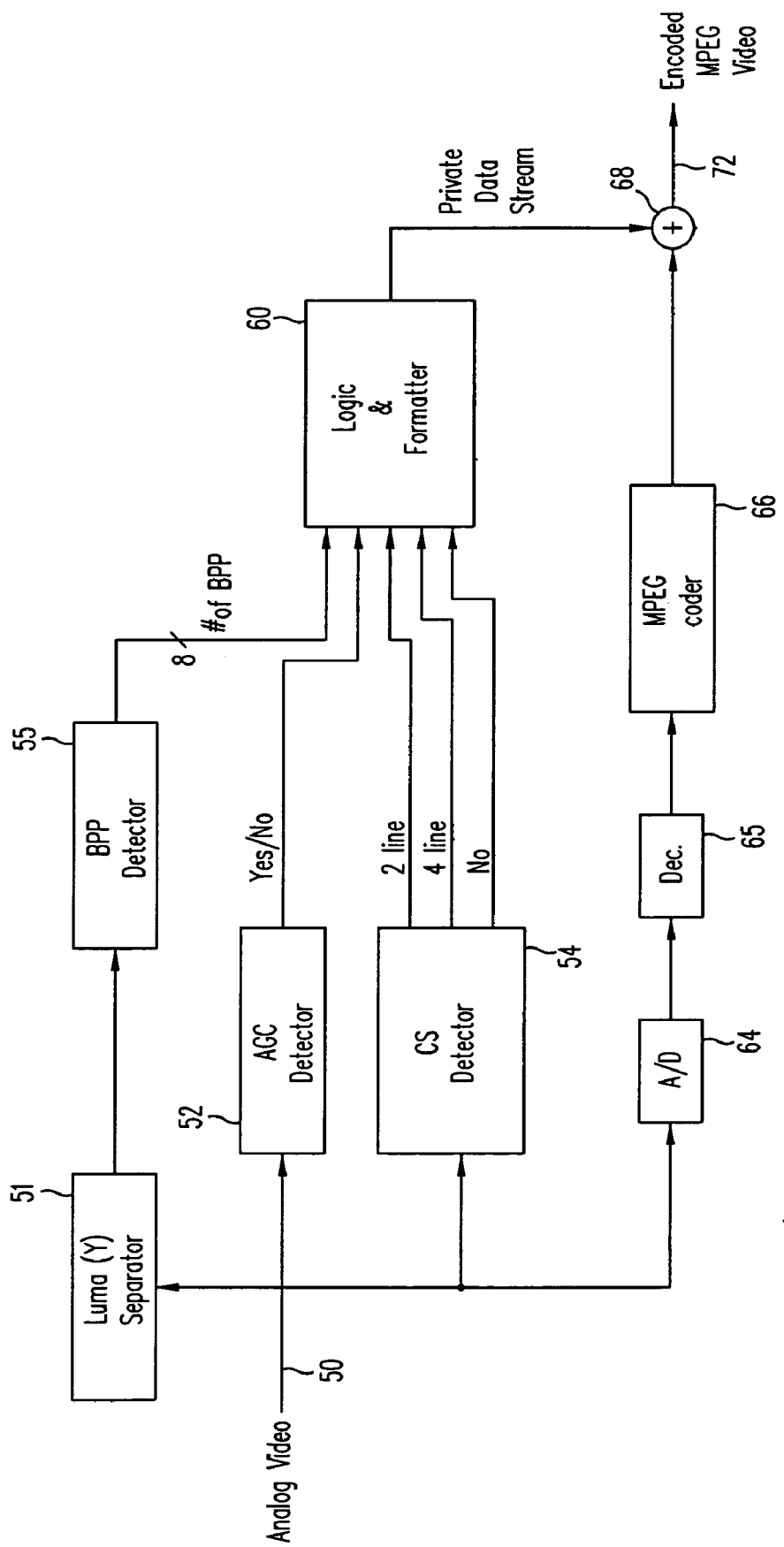
FIG. 4A is a block diagram of a decoder for use for instance in a PVR, DVD recorder or personal computer.

FIG. 1 shows in tabular form the states of an analog protection system (APS) as disclosed herein using the AGC and CS processes. ("APS" is a generic term used in the video field.) In this case four APS states numbered 0-3 are shown in the left hand column. Each state corresponds to the presence/absence of the above described pseudo-sync (AGC) and color stripe (CS) modifications to characteristics of an analog video signal. (This example does not use the BPP modification.) As seen for state 0, both the AGC and the CS are "off", that is not present. Hence this state is a standard video signal for instance of the NTSC or PAL type with no modifications. In this case, as is true of conventional video, unrestricted storage in the PVR (copying) is permitted. State 1 which corresponds to the AGC being on and the CS being off, is an indication of setting the amount of storage time (duration) that the PVR can store video. This is further described below.

State 2, which corresponds to the AGC being on (present) and the presence of the two-line CS process, (explained further below) is an indication of do not store (allow copying of) the video, as explained further below.

State 3, which corresponds to the AGC being on (present) and the CS four-line process being on (present), corresponds to provision of 90 minutes duration of storage for a particular program.

In further detail, the known color stripe process is typically provided commercially so that in any one video field the color stripe process is present in N consecutive scan lines followed by N consecutive scan lines where the color stripe process is absent. This 2 line pattern is repeated. This has been found to be a satisfactory commercial implementation effective for copy inhibition with most U.S. (NTSC-TV) VCRs and television sets using values of N=2 or 4. Of course this is exemplary and not limiting. Hence for purposes of this disclosure two types of color stripe process are described, one being the two-line CS process having two consecutive video scan lines of with the CS followed by two consecutive video scan lines without the CS, etc. The four-line CS process has four video scan lines of CS present and four video scan lines with CS absent, etc.

Hence FIG. 1 defines four states each conveying one piece of control information. Therefore copy inhibition methods (e.g., AGC and CS) are used here to define an encoded pattern thereby to carry data pertaining to control of subsequent storage (in the digital realm) of the associated video program.

Further detail of how these APS states are used is shown in FIG. 2A. In one example, based on previous commercial implementation for the AGC process, it takes three minutes of playing video to ascertain each of the digits of the APS sequence shown on each row of FIG. 2A. Thus it takes nine minutes to uniquely identify which coding (of three digits) has been applied to the video signal. So storage is permitted for the first nine minutes (since APS state 2 has not been found), and after nine minutes it will have been determined how long each unit of the content can persist on the PVR's hard disk drive. So, the unit of content (e.g. a program) for which a permitted use (storage) has been determined is nine minutes while the coding then tells how long that unit can persist (e.g., 36 hours, 1 week, 1 month, . . . ) See FIG. 2A top row showing Storage Duration of 90 minutes; APS Sequence: 3 3 3 3 3 3 . . . . There are DVD video discs that have already been commercially distributed with APS turned on and thus always outputting the APS code 3 3 3 3 3 3. With this encoding, the content from those discs can be stored for up to 90 minutes on a (newly) compliant PVR.

In FIG. 2A the four APS states of FIG. 1 are combined in sequences to carry further information. In the second row of FIG. 2A, it is intended that a video program be stored for 36 hours. Hence the APS sequence begins with APS state 3 indicating that storage is permitted. The storage duration permitted in this example is thus in blocks of 90 minutes duration. The subsequent numbers in the second row of FIG. 2A are a code indicating how long the storage is to persist, which in this case is 36 hours. (Note the absence of the APS state 2 from this sequence since state 2 as shown in FIG. 1 indicates do not store.) In FIG. 2A, row two, the subsequent coding 1 0 3 1 0 etc. indicates that the storage duration is to be set and is to persist, in 90 minute blocks, in this case up to 36 hours. (36 hours is twenty-four 90 minute blocks.) The next row in FIG. 2 indicates if storage is to persist for one week that the APS sequence is 3 followed by the sequence 1 3 1 3 1, etc. Other codes as shown in FIG. 2 are provided for one month or six months of storage persistence. Note that the use of the 90 minute storage duration here is a parameter which can be changed in other examples.

The particular codings, parameters, and values in FIGS. 1 and 2A are only exemplary. The goal here is that a particular use of the video, in this case storage duration, is to be limited or controlled. The overall goal of the rights holder (copyright owner) is to control use—such as he does not want the person making the digital recording to be able to view his recording indefinitely. The rights holder wishes the access to the recording (or its actual existence) to be terminated at a particular time. This time in one embodiment may be determined or extended by paying (additional) fees or some other exchange mechanism. In general however one goal is that the recording (storage) of a particular program or movie, unlike recording as presently available in conventional PVRs, is not to have infinite duration but terminates in a relatively short time to allow only a certain number of viewings. It is to be understood that this system may be used in conjunction with a conventional digital rights management (DRM) system which actually counts the number of viewings and charges the user accordingly.

Another exemplary embodiment for storage control of the APS assigns the meaning to state 0, similar to FIG. 1, which is storage is permitted without limitation, i.e. storage may be engaged in freely of the particular movie/program, which is the case now with PVRs. In other words, there is no restriction on storing. APS state 1 in this other embodiment however corresponds to permitting 90 minutes of storage until such time as the full APS sequence has been determined. If someone connects a video signal to a decoder part way through the sequence, it will still take the full nine minutes to determine the sequence, i.e. the sequence may not always start with 3: so in FIG. 2A row 1, the code 1 0 3 1 0 3 is still distinguishable as 36 hours. Also, no retransmission to a secure digital connection is to be provided. (See description below pertaining to below FIGS. 6A to 6E.) APS state 2 in this other embodiment corresponds to allowing storage indefinitely but there is no permitted retransmission to a secure digital connection during playback. APS state 3 in this other embodiment allows storage to the PVR hard disk drive, for instance for 90 minutes, with retransmission to secure digital connections. Subsequent coding would be provided (as in FIG. 2A) to indicate how many increments of 90 minutes of storage would be allowed so as to give, e.g., a total of 36 hours of duration of storage for that program.

Note that the APS state 0 of FIG. 1 is provided if only to accommodate the conventional (prior art) video programs which have no copy/storage control as described herein.

Yet another example of the coding scheme for storage control is somewhat more complex. This third example uses the FIG. 1 APS state 3 (AGC on and color stripe four line on, for instance) as a pointer as an indication to look elsewhere in the video signal for an encoded indication of the total number of storage duration units, e.g. 90 minute units, to be allowed for that program. For instance, one location for this encoded indication is scan lines 21-22 of NTSC video, currently assigned to the Teletext service but allowing use of a coded value. Another place to put the encoded number of storage duration units is in a watermark including the number. Typically this number would be an indication of the number of time units (for instance 90 minutes) or hours or days that the storage is to be permitted to persist.

It is to be seen that other meanings may be attributed to the coding of FIG. 1 which controls uses such as storage in various ways as determined for instance by the rights holder. The associated playback device (e.g., PVR) must be compatible with the codings in terms of its internal circuitry and software. Hence it is desirable that there be an industry standard (adopted by rights holders and PVR, etc. manufacturers) of the FIG. 1/FIG. 2A type codes so that all PVRs or equivalent devices are compatible, for useful commercial implementation.

The BPP process, by itself or in combination with the AGC and CS processes, also can similarly carry encoded control information. The BPP process is capable of carrying more such information than are the AGC or CS processes since (see above) in one embodiment anywhere from zero to 30 back porch pulses can be added to each frame of video (assuming the back porch pulses are limited to being in the vertical blanking interval, but located both before and after the vertical sync pulses.) This use of 30 such added pulses defines 8 bits of encoded data per frame, without resort to the AGC or CS process at all. The BPP process operates on the video signal in the luminance (Y component) domain rather than in the color (chrominance) domain. In one particular embodiment, one such back porch pulse is added to the back porch of selected ones of the horizontal (synchronization) sync pulses in the vertical blanking interval, both before and after the vertical sync pulses, the number of added back porch pulses per frame defining the encoded data to control use of the video. (Of course if only one back porch pulse is added per horizontal sync pulse in the VBI, this limits the number of such added pulses prior to the vertical sync pulses to six per frame.)

Video encoders are now commercially available which include circuitry to controllably add the BPP modification to video signals; such video encoders are licensed from Macrovision Corp., the assignee of Ryan U.S. Pat. No. 4,819,098. It has been found that use of small numbers of back porch pulses (e.g., less than about six total per frame) has a lessened copy inhibition effect in the analog domain. Normally this is undesirable, but here the BPP modification can thereby carry encoded information with minimal or no effect on subsequent analog domain copying if this is intended. Similarly, the BPP modification generally has less undesirable effect on the playability of legitimate analog domain copies than do the AGC or CS processes.

FIG. 2B shows a variant of the FIG. 1 encoding scheme which also employs the BPP modification, thereby providing many additional APS states, most of which are not used in this embodiment. With additional states available, the use control is more sophisticated. FIG. 2B also shows that the states can be defined to have different meanings in NTSC and PAL TV. As shown, similar to FIG. 1, for APS state 0 copying (storage) is permitted without reservation. For state 1 in NTSC TV, the entry "TS (30/24 h)" means transistory (temporary) storage is permitted for 30 days, but playback is limited to a 24 hour viewing window by a compliant playback device. For state 2 for NTSC TV, "Buffer (90)" means storage is permitted for 90 minutes (as in state 3 in FIG. 1). For state 3 in FIG. 2B, "copy never" is the same as "do not store" in FIG. 1, state 2. States 6-39 and 44-75 are reserved. The other use control entries respectively mean:

COG: Copy one generation only, with no limitation on storage persistence;
COGHD: Copy one generation only with no persistence of storage permitted;
MAD: movement (transfer) permitted within an authorized domain; and
CAD: Copying permitted within an authorized domain. ("Domain" here refers to, e.g., a secure network, see below.)

For the BPP modification, "6 pre" means 6 back porch pulses added pre-vertical sync pulses and similarly "0 pre" means no back porch pulses added pre-vertical sync; "0:6" means a range of zero to 6 back porch pulses are added. In the same way, "0 po" means no back porch pulses are added post-vertical sync, and "1 po" means one back porch pulse is added post-vertical sync, etc.

Note that in FIG. 2B, APS states 0 to 5 by virtue of the AGC and CS modifications restrict (inhibit) analog copying and states 40 to 43 do not since no more than 6 back porch pulses are added per frame in all of states 0 to 5 and 40 to 43. The added back porch pulses here do not interfere with the color burst (either the standard color burst or with the CS) since typically the BPP modification is used in the VBI where only the video luma (Y) component is present, hence no color bursts being present.

Thus, contemplated in accordance with the invention is a record carrier such as a digital video disc (DVD) of video tape which carries time varying control signals for the encoding of the video signal with at least one of the AGC, CS, and BPP or similar processes. As described above, the time varying means that the DVD trigger bits which can carry the APS state values of 0, 1, 2, 3, etc. (i.e. 00, 01, 10, 11) can be set to different values in each and every sector of the DVD video disc.

FIG. 3A shows a block diagram of an encoder 8 in accordance with this disclosure. (It is to be understood that FIG. 3A and other figures showing apparatus are intended to show operation on baseband rather than RF video, as is conventional in the field.) Encoder 8 is an apparatus which converts input digital video into analog video in accordance with this disclosure, with the analog video having the AGC, CS, and BPP modifications carrying the APS data. As an example, an encoder 8 is provided in a television set top box used by a consumer, or in a personal computer receiving video over the Internet. The set top box is typically receiving digital cable TV or digital satellite TV. Encoder 8 thereby provides local encoding of analog video on output terminal 40. The digital input video is received at input terminal 10. This digital video in one embodiment includes a control field for each program in the digital video as transmitted from the head end. A control field of this type is well known for providing control information, for instance for digital rights management, and in this case also carries the copy control data as to whether and how long the particular video program is permitted to be stored.

The digital video input on terminal 10 is coupled to a conventional MPEG decoder 12 which transmits the MPEG formatted video to conventional digital to analog converter 16. Extractor 20 extracts the control field and specifically extracts therefrom the copy control data. The exact format of this copy control data in the digital realm may take any suitable form but of course must be a standard commonly adapted by the content provider (or cable/satellite system head end) and understandable by the encoder 8. The digital copy control data as extracted by extractor 20 is then provided to a copy control memory/formatter 24 which includes memory to store the digital copy control data and to generate therefrom the proper APS sequence shown for instance in FIG. 2A or 2B. If for instance, copying (storage) is to be freely permitted, the generated APS sequence would essentially be that indicated for state 0 in FIG. 1, that is no AGC and no color stripe and some or no BPP. If on the other hand there is some limitation on storage, the generated APS sequence would be one of those shown in FIG. 2A beginning with APS state 3 which means that AGC is to be provided and the CS is to be the four line process. The control data also includes the storage duration in this case as shown in FIG. 2. Hence one of the APS sequences of FIG. 2A (or the FIG. 2B states) is conveyed in digital form to logic 24 which decodes the APS sequence and uses it to turn on/off the (analog) AGC generator 28, the color stripe generator 30 and the BPP generator 33 with associated adders 32, 34, 35. Adding the BPP modification (with relatively few back porch pulses added per frame such as 6 or less) without the AGC or CS modifications permits subsequent VHS (analog domain) video recording while conveying rights (e.g., encoded data) into a downstream compliant digital media recording device. Circuits (analog) for providing the AGC modification, the color stripe modification, and the back porch pulse modification respectively in blocks 28, 30, and 33 are shown respectively in Ryan U.S. Pat. No. 4,631,603 see FIG. 2; Ryan U.S. Pat. No. 4,577,216 see FIG. 1, and Ryan U.S. Pat. No. 4,819,098 see FIG. 4.

Other embodiments of these AGC, CS, and BPP generators of course are also known and these in some embodiments operate in the digital realm so the AGC, CS, and BPP modifications are inserted upstream of converter 16. FIG. 3B thus shows another example of an encoder 9 similar to encoder 8 of FIG. 3A but with the AGC generator 29, CS generator 31 and BPP generator 39 implemented digitally and hence coupled upstream of digital to analog converter 16. Here BPP generator provides up to 8 bits of data as shown to adder (combiner) 35. It is well within the skill of one of ordinary skill in the art to implement generators 29, 31, and 39 digitally. This digital implementation of the AGC, CS, and BPP generators generates a digital representation of the AGC pulses, color burst and back porch pulses sample by sample, which is then converted by converter 16 to analog format. The digital implementation of generators 29, 31, and 39 is readily implemented in an I.C. (integrated circuit).

A suitable encoder need not provide all of the AGC, CS, and BPP modifications; this is a matter of design choice, and the same is true of the compatible decoders. It is to be understood that the encoders of FIGS. 3A or 3B may take many forms such as integrated circuits and may in fact be combined with other circuitry in, for instance, a set top box. Also, functions of the encoder may be accomplished in software executed by a processor. Hence the encoders of FIGS. 3A, 3B are not necessarily standalone devices. Output port (terminal) 40 of the encoders of FIGS. 3A, 3B outputs the analog video including the desired AGC, CS, and BPP modifications so as to provide control of subsequent storage. This analog signal is then suitable for input to, for instance, a television set or PVR or VCR or DVD recorder.

It is to be understood that in certain systems in accordance with this disclosure the encoder of FIG. 3A or 3B may not be present. For instance if video is distributed on a DVD the encoding process would take place at the DVD manufacturing or mastering facility and would not necessarily require a device of the type in FIG. 3A or 3B since typically there is no need to output analog video onto a DVD.

Figure 4B:
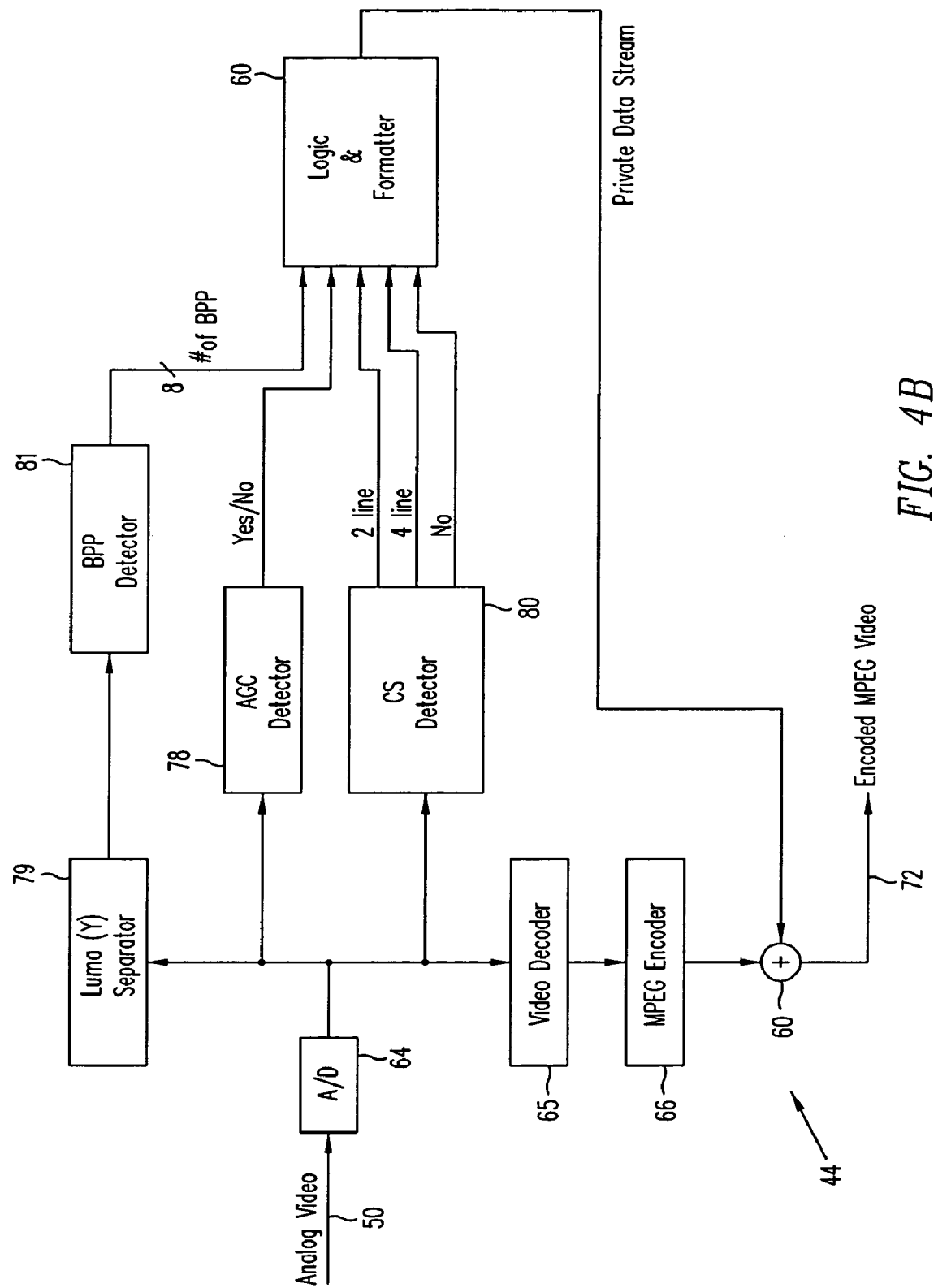
FIG. 4B is another example of a decoder similar to that in FIG. 4A.

FIGS. 4A and 4B show two compatible decoders 42, 44 suitable for use for instance in a PVR or DVD recorder or personal computer equipped with a video capture card, in accordance with this disclosure. These decoders 42, 44 are largely equivalent, but the FIG. 4A decoder 42 performs more functions in the analog realm whereas the FIG. 4B decoder performs more functions in the digital realm. A PVR may be combined into a cable/satellite TV set top box, in which case the FIG. 4A/4B encoder may also be combined into such a set top box.

In FIG. 4A the analog video signal, already encoded with the APS sequence of FIGS. 1 and 2, is provided to the encoder 42 on its input port 50. This analog video is, e.g., composite or component video. Again this is typically baseband video since no RF tuning is provided in the FIG. 4A encoder; any needed RF tuning is provided upstream and not shown. The analog video is then applied to AGC detector 52 and color stripe (CS) detector 54 and BPP detector 51 via luma (Y) separator 51. An example of an AGC detector 52 is shown in FIG. 4 of Quan U.S. Pat. No. 6,421,497 incorporated herein by reference. Other types of AGC detection may also be used. (AGC detector 52 includes all the elements of the detector of FIG. 4 of Quan except its block 14.) The AGC detector 52 outputs an indication of the presence of the AGC modification in the input analog video. This indication may be in terms of a yes/no as shown (logical I/O), for instance if the AGC pulse is present on a particular scan line the output is logical one (yes) where its absence is indicated by logical 0 (no).

An example of the color stripe detector 54 is shown for instance in Brill et al. U.S. Pat. No. 6,600,873 incorporated herein by reference, see FIG. 3. (The FIG. 3 Brill color stripe detector also includes a switch 46 not needed here.) Another example of a color stripe detector is shown in Quan, et al U.S. Pat. No. 5,784,523, also incorporated herein by reference, see FIG. 3. (The Quan, et al color stripe detector of FIG. 3 includes a modification circuit 22 not needed here.) Also the color stripe detector 54 needs to detect both the two line and four line color stripe processes and to distinguish therebetween. Hence as shown in Quan, et al U.S. Pat. No. 5,784,523, FIG. 3 the color stripe location memory tracks at least 5 video scan lines at a time. Hence color stripe detector 54 indicates the absence of the color stripe or the presence of the two-line color stripe or the four-line color stripe.

The color stripe detector, whether operating in the analog or digital domain, determines the location of the color burst in N+1 successive lines. It determines within these N+1 successive lines if there is any difference in the location (phase) of the color burst. For instance if it is a two-line (N=2) detector, it compares three successive horizontal scan lines. If it is a four-line (N=4) detector, it compares five successful horizontal scan lines. If these N+1 lines all match up in terms of the color burst location, then the color stripe process is absent. However a deviation indicates the presence of the color stripe process in that particular set of video scan lines. The APS sequence of FIG. 2 would typically change at the very quickest once every frame; however in practice it is likely to change on the order of every three minutes (every 90 frames of NTSC TV).

With routine modification to the timing parameters shown in FIG. 4 of Quan U.S. Pat. No. 6,421,497 (incorporated herein by reference in its entirety), suitable BPP detection as in detector 55 is accomplished.

The output signals from AGC detector 52, color stripe detector 54, and back porch pulse detector 55 are then applied to logic 60 which is, e.g., a control circuit or a microprocessor or hardwired logic, which depending on the input signals from detectors 52 and 54 determines in one embodiment whether the analog video in any given frame is indicating any one of the APS states. Logic 60 also aggregates the APS states over a sequence of frames to determine the APS sequence. It is assumed that all video will be in at least one of these states where state 0 is the default state as in the prior art not using the encoding method as disclosed herein. BPP detector 55 in this embodiment provides an 8 bit detection signal to logic 60.

Logic 60 in response formats and outputs a "private" (digital) data stream of the type known in MPEG which in this case carries data to indicate whether recording (storage) is to be permitted or not, and if permitted if there is a duration limitation on the recording of the type shown in FIG. 2A or 2B. This portion of the private data stream is of any convenient format but of course must be compatible with other elements in the system and hence is an agreed upon standard. The private data stream can be a conventional MPEG private data stream which is multiplexed with the MPEG-2 program (user data) stream having the MPEG-2 video elementary and audio data streams. Alternatively, the private data stream is a data structure separate from the MPEG-2 program stream.

The input analog video at port 50 is also coupled to conventional analog to digital converter 64 which outputs digital video which is coupled to conventional video decoder 65 and then is encoded by conventional MPEG encoder 66 into the MPEG-2 format. The video decoder 65 conventionally separates the composite video signal (including color burst and sync pulses) coming in as one stream down to three streams: luma also called luminance (Y), and two color (chrominance) difference signals (R-Y) and (B-Y). All three of those signals are then conventionally individually MPEG-2 compressed and multiplexed into the final MPEG-2 video stream. This MPEG video content is then combined with the private data stream from logic 60 at combiner 68 to provide, at output terminal 72, MPEG video (digital video) including the required copy control data. Again of course any compliant PVR or DVD recorder or personal computer includes further circuitry or logic (not shown here but described below) which interprets this copy control data so as to limit subsequent storage.

FIG. 4B shows another example of a decoder 44 in most respects similar to that of FIG. 4A and having the same elements carrying similar reference numbers. However in FIG. 4B detection of the AGC, color stripe, and back porch pulse signals is performed in the digital realm. Hence FIG. 4B, rather than having analog AGC detector 52 and back porch pulse analog color stripe detector 54 and back porch pulse detector 55, instead has digital AGC detector 78, digital color stripe detector 80, and digital back porch pulse detector 81 coupled via (digital) luma separator 79. However except for the fact that these are implemented in digital circuitry (or alternatively software readily written in light of this disclosure) they operate the same way as do respectively the analog detectors 52, 54, and 55.

The encoders of FIGS. 4A and 4B as explained above are typically incorporated within a PVR or DVD recorder or similar device such as a personal computer. As stated above, any such encoder need not have all of the AGC, CS, and BPP detectors. The circuitry may be on the same I.C. (integrated circuit) as other circuitry in these devices or it might be on a separate I.C. Certain of the functions of these encoders may be carried out in software rather than in circuitry. It is readily understood by one of ordinary skill in the art how software may be substituted for circuitry to perform the required functionality.

Figure 5:
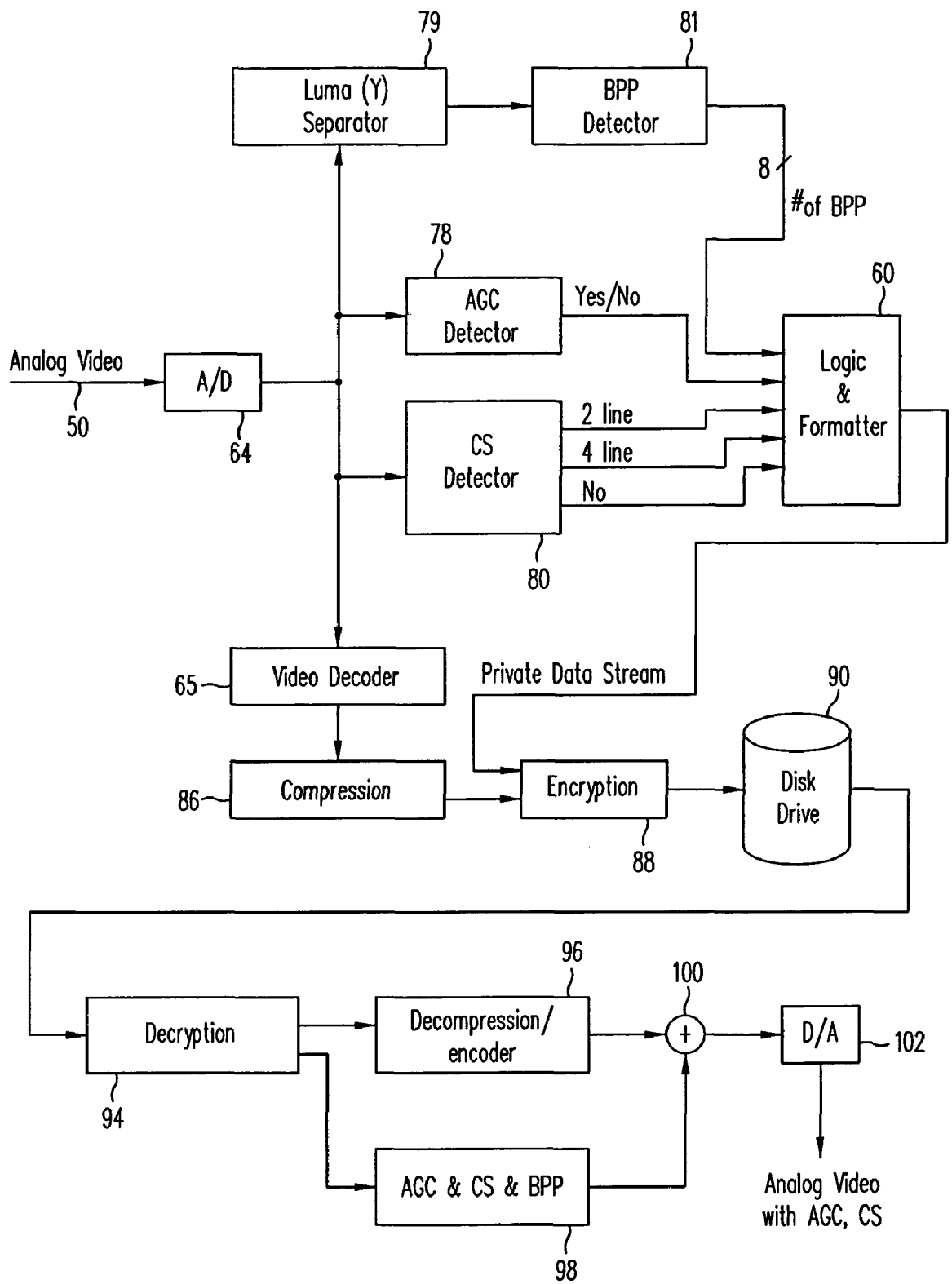
FIG. 5 is a block diagram of a decoder of the type in FIG. 4A together with other elements in a personal video recorder.

FIG. 5 is a block diagram of an example of a personal video recorder in accordance with this disclosure. Many conventional elements of the PVR are omitted, such as the television tuner and user interface. These are conventional as well known in the field; only those elements necessary for understanding are shown. Many of the elements shown in FIG. 5 are identical to those shown for instance in FIG. 4B and similarly labeled and hence not discussed further herein. Elements shown in FIG. 5 (which are typically also present in a conventional PVR) are a video compression circuit 86 which compresses both the user data in accordance, for instance, with MPEG. The compressed video (plus the private data stream) is then subject to encryption by encryptor 88. Such encryption is conventional in the field. Typically the encryption key is unique to the individual PVR device so that the recorded PVR material stored on the hard disk drive 90 cannot be ported over to other PVRs even from the same manufacturer and of the same model. Hence the encryption "binds" a particular recording to this particular PVR device.

Of course, the PVR of FIG. 5 also has playback capability. Only relevant elements of the playback circuitry are shown since the remainder is conventional. When playback is desired, the user conventionally chooses what program he wants to view. At this point the recording control comes into play. In one embodiment the PVR's processor (not shown) maintains a record in memory (e.g., on its hard disk drive) for each program as to when storage of that program expires, as expressed by the APS code sequence associated with that program. That expiration date may be held in a separate stored table or appended to each program in storage. Upon expiration, the processor deletes or overwrites that program from hard disk drive 90. In another embodiment, the particular key used for encryption (and later decryption) by encryption circuit 88 is assigned a similar expiration time, and after its expiration the key is no longer available, making decryption unsuccessful due to lack of the key. In this case, there is a subsequent step of later deleting or overwriting inaccessible programs from hard disk drive 90.

The encrypted data (program) read out from hard disk 90 is subject to decryption by decryptor 94 using the same key (if not expired) as used for the encryption. That program as decrypted is provided to video encoder 96 which decompresses the video and converts the stored MPEG video into digital format to be converted to analog format by digital to analog converter 96. At the same time the decrypted private stream portion of the program is separated out (e.g., by the PVR processor, not shown) and the storage control data therein is conveyed to AGC/color stripe/back porch pulse generator 98. The private stream data indicates the present/absence and nature of the AGC, color stripe, and back porch pulse processes according to the APS sequence which is part of the private stream data and is used to control generator 98. Examples of suitable (analog circuit) AGC, CS, and BPP generators are shown as stated above respectively in Ryan U.S. Pat. No. 4,631,602 FIG. 2, Ryan U.S. Pat. No. 4,577,216 FIGS. 1, 2, and Ryan U.S. Pat. No. 4,819,098 FIG. 4. The resulting AGC, CS and BPP modifications (here generated in the digital realm but that is not restrictive) are then combined at combiner 100 into the digital video content which is then conveyed to digital to analog converter 102 and hence output as analog video with the same (or modified) AGC, color stripe, and back porch pulse modifications as present in the original input video analog. The AGC, CS, and BPP modifications that are inserted during playback from the PVR are likely to be different from the encoding that was on the original video. In most instances (for generational copy control), content that was originally encoded as permitting storage will now be encoded with APS state 2 of FIG. 1 indicating that no subsequent storage is permitted.

Various playback options are available using the PVR of FIG. 5. In one option the video is output, without any AGC, color stripe, or back porch pulse process, as unmodified video which is standard as in the field. In the second option (shown in FIG. 5) the output analog video includes a replication of the input AGC/CS/BPP modifications. In another option, which is a variant of the second, the output video is modified to change the APS state in terms of, e.g., going from copying being permitted to not being permitted, or from copying and storage being permitted for time T instead to time T-d. For instance in one embodiment, the duration of permitted storage is less for the output analog video then for the input analog video.

Figure 6A:
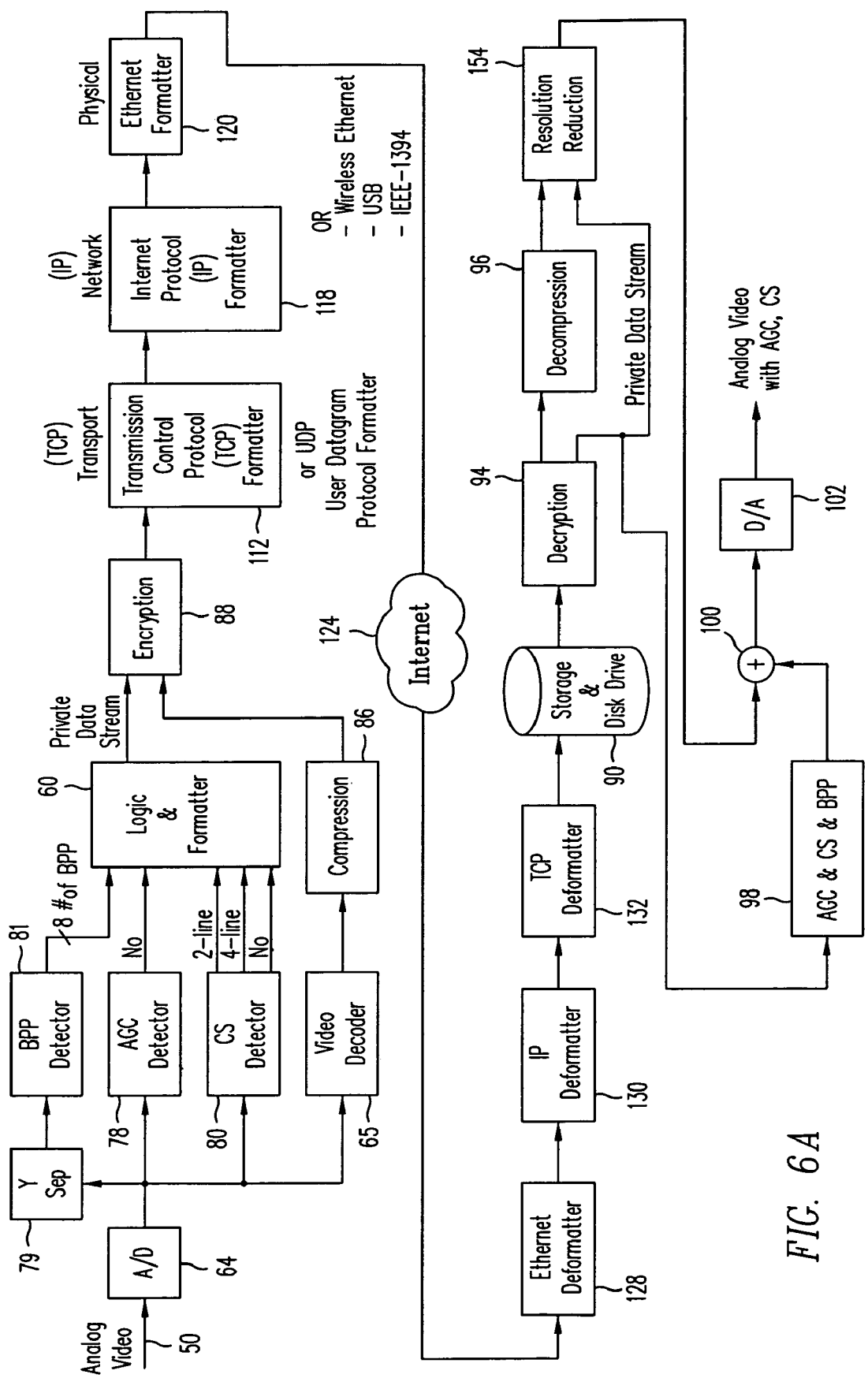
FIGS. 6A to 6D show use of the present system for Internet transmission of video.

FIGS. 6A to 6D illustrate uses of the present encoding method for purposes other than storage control. For instance, one other use is to employ one of the FIG. 2A APS sequences to indicate that permission to transfer (move) the accompanying video content across a secure digital network (such as the Internet) is granted or prohibited. Longer APS sequences allow control of other uses, up to, e.g., a maximum of 12. FIG. 6A illustrates this and shows a system having a number of elements (blocks) similar to those of FIGS. 4B and 5, but arranged differently. The upper left hand part of FIG. 6A resembles that of FIGS. 4B and 5, however the encrypted video from encryptor 88 is coupled via switch 110 to TCP (transmission control protocol) formatter 112, switch 110 controlled by logic 60 via line 114 to control whether transmission over the TCP/IP (internet protocol) is permitted or prohibited, depending on the detected APS sequence.

Downstream elements in FIG. 6A include the IP formatter 118 and physical layer (e.g., Ethernet) formatter 120. Alternatively TCP formatter 112 is replaced by a User Datagram Protocol (UDP) formatter, and Ethernet formatter 120 is replaced by a formatter adapted for wireless Ethernet, USB (universal serial bus) or IEEE 1394 standard communications. Formatter 120 is conventionally connected via the Internet and/or a home network 124 at the receiving end to Ethernet deformatter 130, IP deformatter 128, IP deformatter 130, and TCP deformatter 132. All elements 110 to 132 are conventional.

Figure 6B:
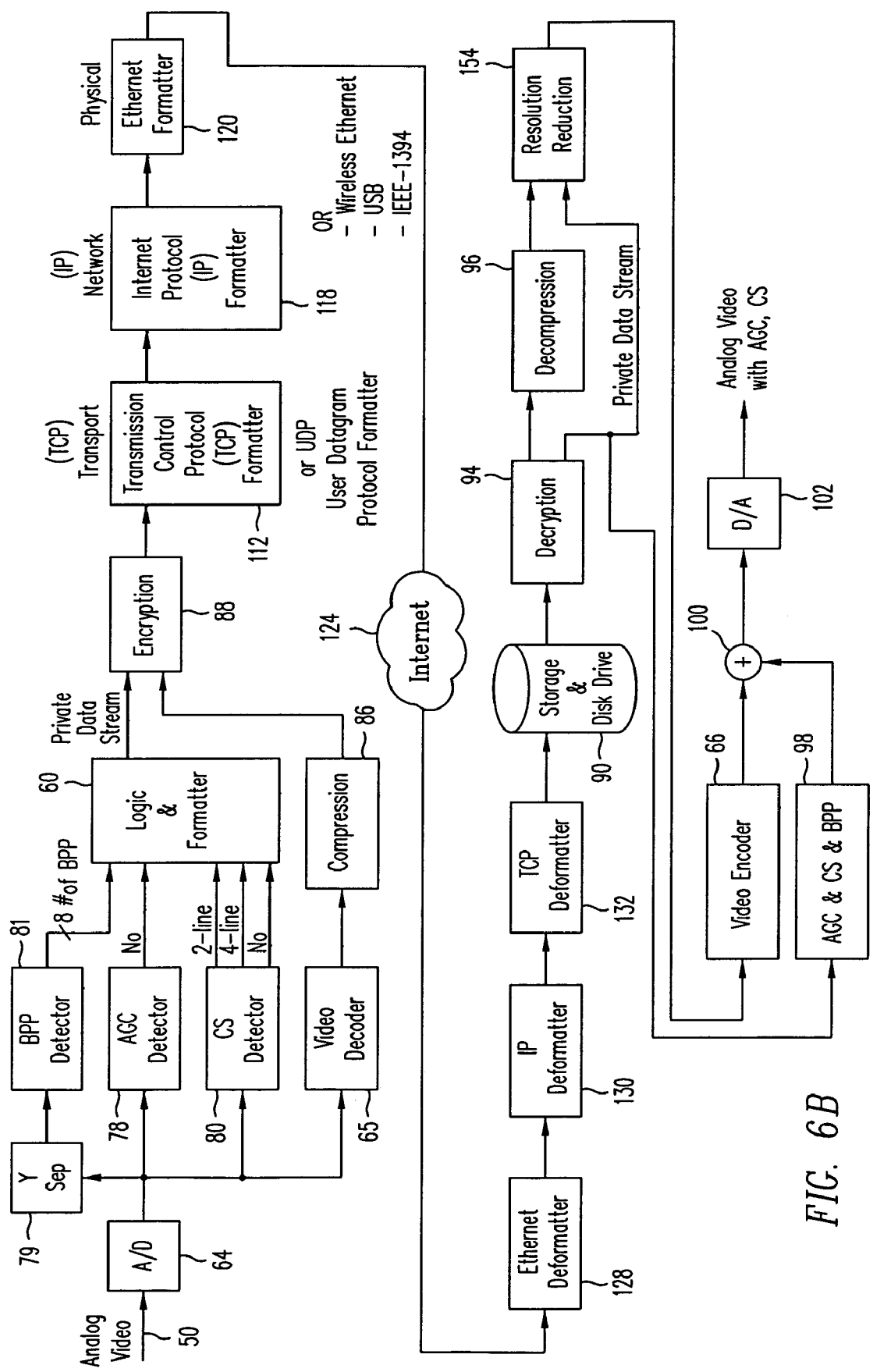
Figure 6C:
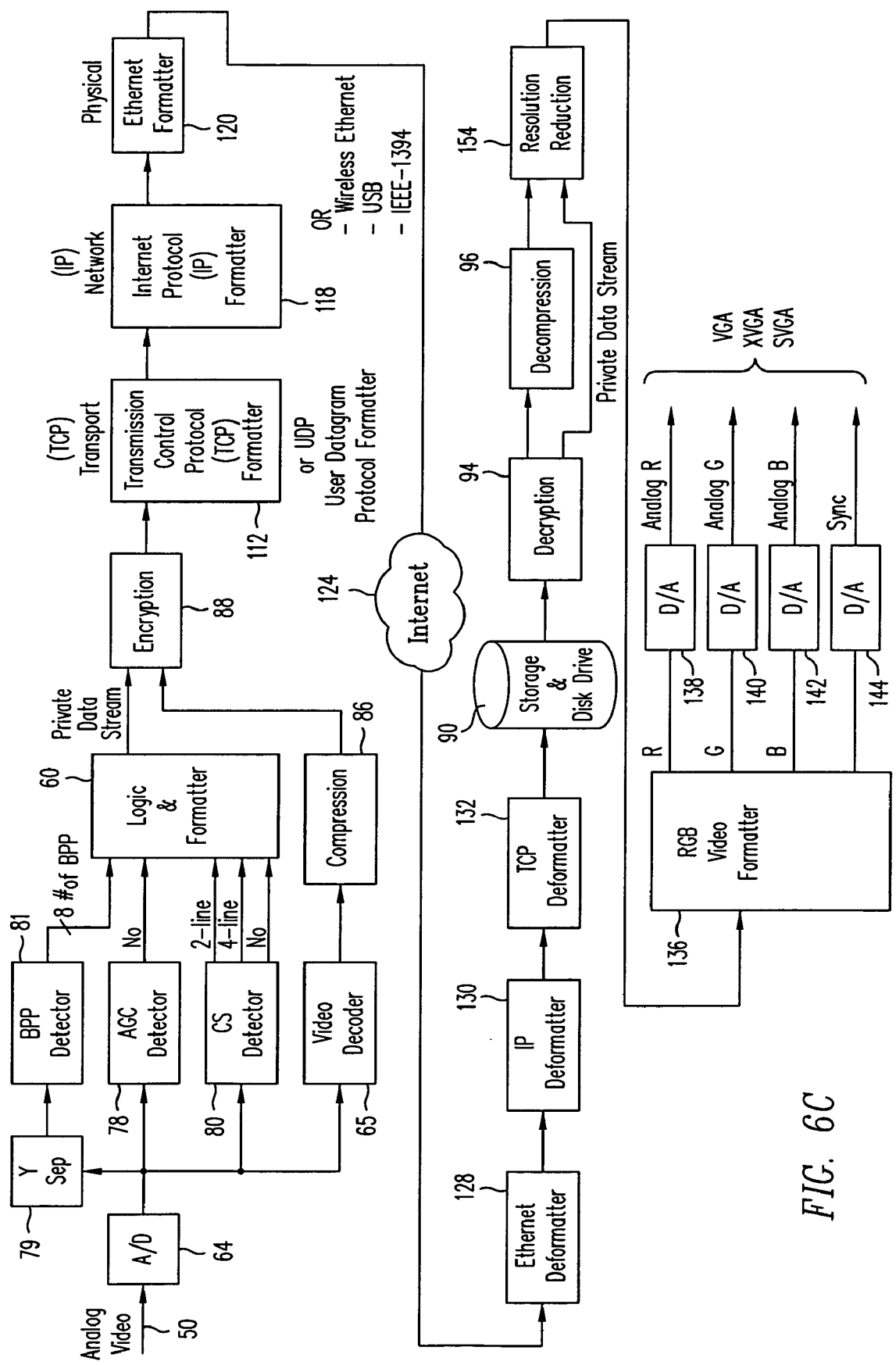
Figure 6D:
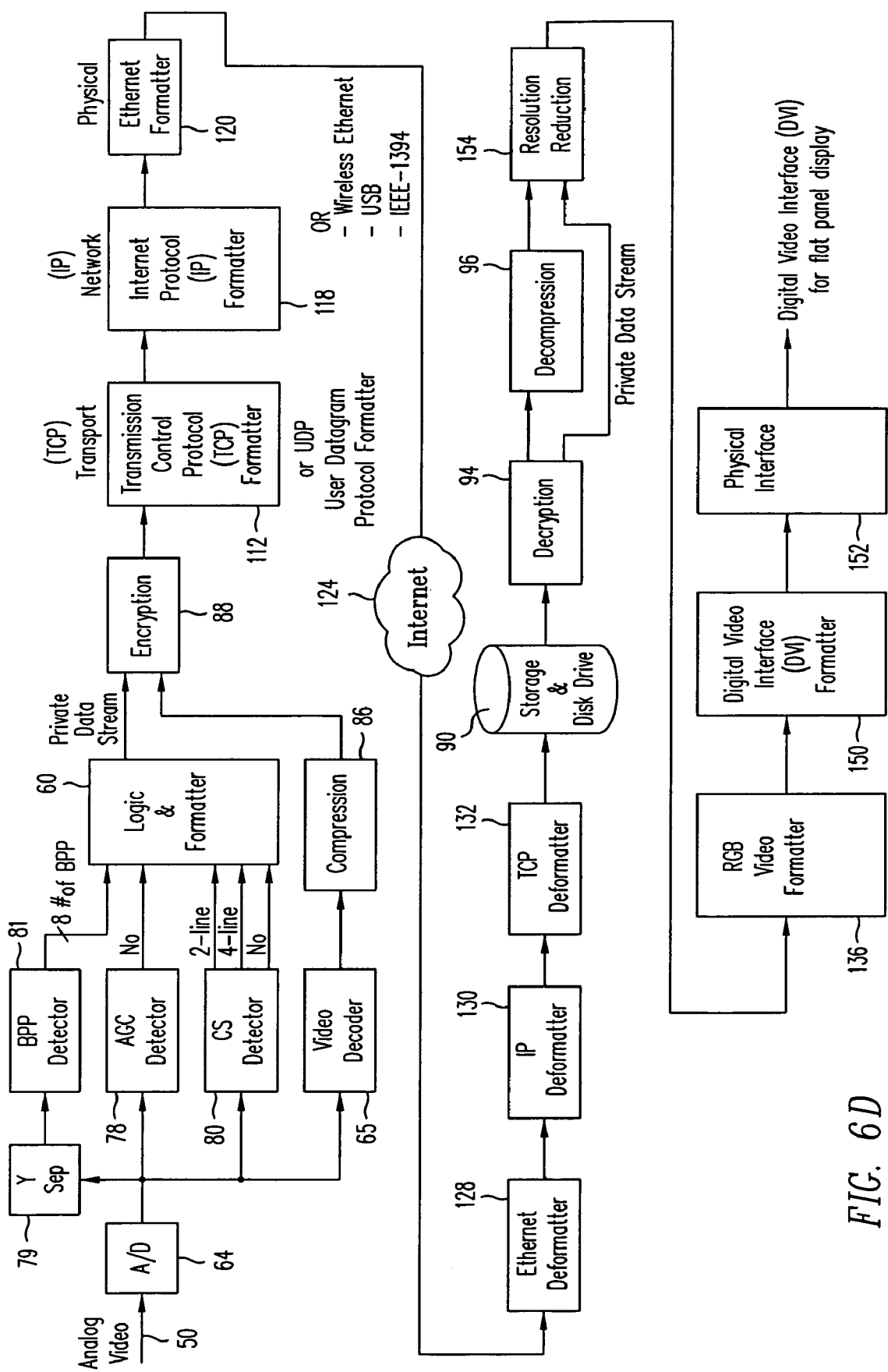

FIGS. 6B to 6D show variants of the FIG. 6A system, for various control uses of the APS encoding method, with like elements similarly labeled. FIG. 6B shows the system configured for control of rendering uses where the output video at the receiving end (lower right of figure) is composite/component analog video. In this case resolution video reduction circuit 154 is coupled upstream of video encoder 66 to provide a particular image resolution or quality level, in terms of number of pixels.

FIG. 6C is similar to FIG. 6B except that at the output there is provided computer-type analog component video of the VGA, XVGA, or SVGA type. As in FIG. 6B, there is resolution reduction circuit 154, here connected to RGB video formatter 136 driving four digital to analog converters 138, . . . , 144 providing red (R), green (G), blue (B) and synchronization (sync) analog video output signals.

FIG. 6D is a variant of FIG. 6C arranged to output digital video, e.g. conforming to the DVI standard, as used to drive a flat panel display. Here RGB video formatter 136 is coupled to a digital video (e.g., DVI) interface 150 in turn driving the flat panel display physical interface 152.

This disclosure is illustrative and not limiting; further modifications will be apparent to one skilled in the art in light of this disclosure. For instance, circuitry disclosed herein as being of the analog type may be embodied digitally and vice-versa; also elements shown here as circuit elements may be embodied as software executed by a suitable processor, and coding such software would be within the skill of one of ordinary skill in the art in light of this disclosure. All such modifications are intended to fall within the scope of the invention as defined by the appended claims.

The invention claimed is:

1. A method of encoding an analog video signal, comprising the acts of:
providing a digital video signal including content and data pertaining to control of subsequent uses of the content;
converting the digital video signal to an analog video signal;
extracting the data from the digital video signal;
generating signals modifying at least one characteristic in blanking intervals of the analog video signal from the extracted data to define an encoded pattern corresponding to the data, wherein each of the modified characteristics is of the type to inhibit making an acceptable analog recording of the video signal; and
using the generated signals to modify the analog video signal;
wherein the at least one characteristic defines the encoded pattern which specifies the three states of:
an off state;
an indication of allowing subsequent digital storage; and
an indication of how long to allow subsequent digital storage;
wherein the indication of how long to allow subsequent digital storage is a watermark located in the modified analog video signal including an encoded number of digital storage duration units.

2. The method of claim 1, wherein there are two of the characteristics, a first being in the horizontal blanking intervals and a second being in the vertical blanking intervals.

3. The method of claim 1, wherein the characteristics are selected from a group consisting of: a phase of the color burst, the presence of paired negative and positive going pulses, and the presence of a positive going pulse in back porches of horizontal synchronization signals.

4. The method of claim 3, wherein the phase of the color burst is modified in a repeated pattern of 2 or 4 scan lines of the video signal.

5. The method of claim 1, wherein the method is carried out in a set top box, DVD player, or playback device.

6. The method of claim 1, wherein the uses include one of:
transmitting the video signal across a network;
displaying the video signal at a particular resolution or quality level;
storing the video signal in digital form; and
moving the video signal from a first to a second digital storage device.

7. The method of claim 1, wherein the video signal includes audio.

8. The method of claim 1, wherein the at least one characteristic is a pulse added to a back porch of a predetermined number of horizontal synchronization pulses in a vertical blanking interval of the video signal.

9. The method of claim 8, wherein the predetermined number is less than six.

10. The method of claim 8, wherein the predetermined number is insufficient to inhibit making an acceptable analog recording.

11. The method of claim 8 wherein the predetermined number defines the encoded pattern.

12. The method of claim 8, wherein the predetermined number is in the range of zero to fifteen both prior to and after the vertical synchronization pulse of the vertical blanking interval.

13. A video encoding apparatus, comprising:
a port adapted to receive a digital video signal;
a digital to analog converter coupled to the port to receive the digital video signal;
an extractor circuit coupled to the port thereby to extract from the digital video signal data pertaining to subsequent uses of content of the digital video signal;
control circuitry coupled to the extractor circuit and which generates signals modifying at least one characteristic in blanking intervals of the analog video signal responsive to the extracted data, wherein each of the modified characteristics is of the type to inhibit making an acceptable analog recording of the video signal; and
a combiner coupled to an output terminal of the digital to analog converter and to the control circuitry thereby to provide an encoded analog video signal;
wherein the at least one characteristic defines the encoded pattern which specifies the three states of:
an off state;
an indication of allowing subsequent digital storage; and
an indication of how long to allow subsequent digital storage;
wherein the indication of how long to allow subsequent digital storage is a watermark located in the analog video signal including an encoded number of digital storage duration units.

14. The apparatus of claim 13, wherein there are two of the characteristics, a first being in the horizontal blanking intervals and a second being in the vertical blanking intervals.

15. The apparatus of claim 13, wherein the characteristics are selected from a group consisting of: a phase of the color burst, the presence of paired negative and positive going pulses, and the presence of a positive going pulse in back porches of horizontal synchronization signals.

16. The apparatus of claim 15, wherein the phase of the color burst is modified in a repeated pattern of 2 or 4 scan lines of the video signal.

17. The apparatus of claim 13, wherein the apparatus is a set top box, DVD player, or playback device.

18. The apparatus of claim 13, wherein the at least one characteristic is a pulse added to a back porch of a predetermined number of horizontal synchronization pulses in a vertical blanking interval of the video signal.

19. The apparatus of claim 18, wherein the predetermined number is less than six.

20. The apparatus of claim 18, wherein the predetermined number is insufficient to inhibit making an acceptable analog recording.

21. The apparatus of claim 20 wherein the predetermined number defines the encoded pattern.

22. The apparatus of claim 18, wherein the predetermined number is in the range of zero to fifteen both prior to and after the vertical synchronization pulse of the vertical blanking interval.

23. A method of processing a video signal, comprising the acts of:
receiving an analog video signal with at least one characteristic in its blanking intervals modified to define an encoded pattern corresponding to data relating to subsequent digital use of the video signal, wherein the modified characteristic also is of the type to inhibit making an acceptable analog recording of the video signal;
detecting the characteristic;
converting the received analog video signal to a digital video signal; and
using the detected characteristic to determine subsequent uses of the digital video signal;
wherein the at least one characteristic defines the encoded pattern which specifies the three states of:
an off state;
an indication of allowing subsequent digital storage; and
an indication of how long to allow subsequent digital storage;
wherein the indication of how long to allow subsequent digital storage is a watermark located in the analog video signal including an encoded number of digital storage duration units.

24. The method of claim 23, wherein there are two of the characteristics, a first being in the horizontal blanking intervals and a second being in the vertical blanking intervals.

25. The method of claim 23, wherein the characteristics are selected from a group consisting of a phase of the color burst, the presence of paired negative and positive going pulses, and the presence of a positive going pulse in back porches of horizontal synchronization signals.

26. The method of claim 25, wherein the phase of the color burst is modified in a repeated pattern of 2 or 4 scan lines of the video.

27. The method of claim 23, wherein the method is carried out in one of a set top box, a video recorder, or a personal computer.

28. The method of claim 23, further comprising the act of storing the digital video signal.

29. The method of claim 28, further comprising the act of converting the digital signal to MPEG format prior to the act of storing.

30. The method of claim 28, further comprising the acts of compressing and encrypting the digital signal prior to the act of storing.

31. The method of claim 30, further comprising the act of preventing decryption of the stored video at the expiration of a time determined by the encoded pattern.

32. The method of claim 28, further comprising the act of deleting the stored video or disabling further usage of the video at the expiration of a time determined by the encoded pattern.

33. The method of claim 28, further comprising the acts of:
converting the stored digital video signal to an output analog video signal; and
modifying the characteristic in the output analog video signal thereby to inhibit making an acceptable video recording therefrom.

34. The method of claim 23, wherein the uses include one of:
transmitting the video signal across a network;
displaying the video signal at a particular resolution or quality level;
storing the video signal in digital form; and
moving the video signal from a first to a second digital storage.

35. The method of claim 23, wherein the video signal includes audio.

36. The method of claim 23, wherein the at least one characteristic is a pulse added to a back porch of a predetermined number of horizontal synchronization pulses in a vertical blanking interval of the video signal.

37. The method of claim 36, wherein the predetermined number is less than six.

38. The method of claim 36, wherein the predetermined number is insufficient to inhibit making an acceptable analog recording.

39. The method of claim 36, wherein the predetermined number defines the encoded pattern.

40. The method of claim 36, wherein the predetermined number is in the range of zero to fifteen both prior to and after the vertical synchronization pulse of the vertical blanking interval.

41. A video decoding apparatus, comprising:
a port adapted to receive an analog video signal;
a detector coupled to the port and which detects modifications to at least one characteristic in blanking intervals of the analog video signal;
a control circuit coupled to an output terminal of the detector and which provides a control signal in response to detection of an encoded pattern defined by the modified characteristic;
an analog to digital converter coupled to the port to receive the analog video signal;
a video decoder coupled to an output terminal of the analog to digital converter and which separates a composite video signal into luminance and chrominance signals; and
a combiner coupled to an output terminal of the decoder and to receive the control signal from the control circuit, thereby to output a digital video signal including data indicating its subsequent uses;
wherein the at least one characteristic defines the encoded pattern which specifies the three states of:
an off state;
an indication of allowing subsequent digital storage; and
an indication of how long to allow subsequent digital storage;
wherein the indication of how long to allow subsequent digital storage is a watermark located in the analog video signal including an encoded number of digital storage duration units.

42. The apparatus of claim 41, wherein the analog to digital converter is coupled between the port and the detector.

43. The apparatus of claim 42, wherein the detector is coupled to receive the analog video signal in analog form.

44. The apparatus of claim 41, further comprising a storage device coupled to store the video signal in digital form.

45. The apparatus of claim 41, wherein the video decoder is an MPEG decoder.

46. The apparatus of claim 41, further comprising:
a compression circuit coupled to receive the encoded video signal; and
an encryption circuit coupled to receive the compressed video signal.

47. The apparatus of claim 41, wherein there are two of the characteristics, a first being in the horizontal blanking intervals and a second being in the vertical blanking intervals.

48. The apparatus of claim 41, wherein the characteristics are selected from a group consisting of: a phase of the color burst, the presence of paired negative and positive going pulses, and the presence of a positive going pulse in back porches of horizontal synchronization signals.

49. The apparatus of claim 48, wherein the phase of the color burst is modified in a repeated pattern of 2 or 4 scan lines of the video.

50. The apparatus of claim 41, wherein the apparatus is in one of a set top box, a video recorder, or a personal computer.

51. A non transitory record carrier having material recorded thereon, the recorded material comprising:
a video signal including in its blanking intervals at least one modified characteristic defining an encoded pattern corresponding to data relating to subsequent uses of the video signal;
wherein the modified characteristic is of the type to inhibit making an acceptable analog recording of the video signal;
wherein the at least one characteristic defines the encoded pattern which specifies the three states of:
an off state;
an indication of allowing subsequent digital storage; and
an indication of how long to allow subsequent digital storage;
wherein the indication of how long to allow subsequent digital storage is a watermark located in the analog video signal including an encoded for number of digital storage duration units.

52. The carrier of claim 51, wherein there are two of the characteristics, a first being in the horizontal blanking intervals and a second being in the vertical blanking intervals.

53. The carrier of claim 51, wherein the characteristics are selected from a group consisting of a phase of the color burst, the presence of paired negative and positive going pulses, and the presence of a positive going pulse in back porches of horizontal synchronization signals.

54. The carrier of claim 53, wherein the phase of the color burst is modified in a repeated pattern of 2 or 4 scan lines of the video signal.

55. The carrier of claim 51, wherein the carrier is a video disc or video tape.

56. The carrier of claim 51, wherein the carrier is a video disc carrying a plurality of bits indicating the modified characteristic.

57. The carrier of claim 51, wherein the at least one characteristic is a pulse added to a back porch of a predetermined number of horizontal synchronization pulses in a vertical blanking interval of the video signal.

58. The carrier of claim 57, wherein the predetermined number is less than six.

59. The carrier of claim 57, wherein the predetermined number is insufficient to inhibit making an acceptable analog recording.

60. The carrier of claim 57, wherein the predetermined number defines the encoded pattern.

61. The carrier of claim 57, wherein the predetermined number is in the range of zero to fifteen both prior to and after the vertical synchronization pulse of the vertical blanking interval.

* * * * *